Patented Feb. 16, 1937

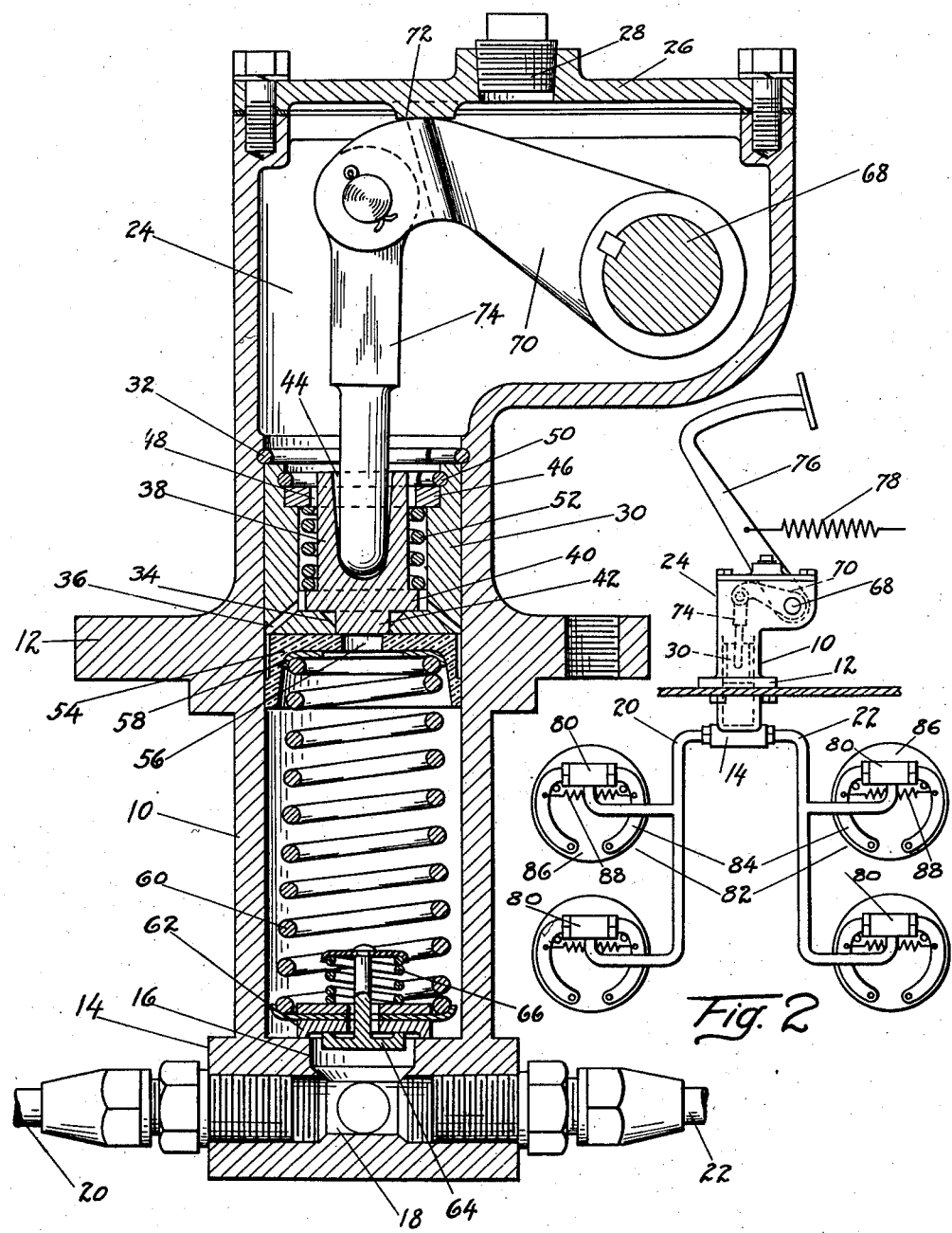

2,071,059

UNITED STATES PATENT OFFICE 2,071,059

COMPENSATING MASTER CYLINDER

Herbert C. Bowen, Detroit, Mich., assignor to Hydraulic Brake Company, Detroit, Mich., a corporation of California Application May 17, 1933, Serial No. 671,488

10 Claims. (Cl. 60—54.6)

This invention relates to hydraulic brakes, and more particularly to hydraulic brakes for motor vehicles.

Broadly the invention comprehends a hydraulic brake system including a compensating master cylinder connected in the system and operated to maintain the system and the cylinder filled solidly with an operating fluid or liquid and thus avoid the presence of air in the system.

An object of the invention is to provide a compensating master cylinder for a hydraulic brake system including means operative to place a column of fluid or liquid under pressure and upon release of the pressure to by-pass the fluid first in one direction and then in another, so that the system may be maintained solidly filled with fluid.

A feature of the invention is a piston having a port in the head thereof and a spring-pressed plunger in the piston controlling the port.

Another feature of the invention is a piston having a head provided with an axial port and a plurality of spaced passages and means carried by the piston for controlling the port and passages.

Other objects and features of the invention will more fully appear from the following description taken in connection with the accompanying drawing which illustrates one embodiment of the invention, and in which,—

Figure 1 is a vertical sectional view of the compensating cylinder, and

Figure 2 is a diagrammatic illustration of a hydraulic brake system embodying the invention.

Referring to the drawing for more specific details of the invention, 10 represents a cylinder having a flange or lug 12 by which the cylinder may be suitably secured in position. The outlet end of the cylinder is closed as by a head 14 having a port 16 communicating with a transverse passage 18, in the respective ends of which are suitably secured conduits 20 and 22 leading to a braking structure to be hereinafter described. The inlet end of the cylinder communicates with a chamber or reservoir 24 having an opening normally closed as by a cover plate 26 provided with a filling opening closed by a plug 28.

A piston 30 is positioned for reciprocation in the inlet end of the cylinder, movement of the piston being limited in one direction by a split-retaining ring 32 seated in a circumferential groove in the wall of the cylinder. The piston comprises a head having a skirt providing a chamber. The head is provided with an axial bore or port 34 and a plurality of spaced ducts or passages 36 leading from the chamber provided by the skirt of the piston to the periphery of the head of the piston.

A spring-pressed plunger 38 is positioned in the chamber provided by the skirt of the piston. As shown, the head of the plunger 38 has an annular flange 40 adapted to seat on the back of the piston head, and a projection or tip 42 arranged to close the port 34, and the force applying end of the plunger has a recess 44, the object of which will hereinafter appear.

The plunger is supported by a washer 46 seated on an annular shoulder in the skirt of the piston. This washer is provided with a plurality of spaced grooves or passages 48 arranged on its inner periphery for free passage of fluid or liquid. A retaining ring 50 seated in a circumferential groove in the skirt of the piston secures the washer against displacement, and a spring 52 sleeved on the plunger between the annular flange 40 and the washer 46 urges the plunger towards its seat on the back of the piston head. When the plunger is seated, the projection or tip 42 closes the port 34, and presents an unbroken surface on the head of the piston.

A leak-proof cup 54 is positioned on the head of the piston. This cup has an opening 56 providing a direct communication between the cylinder and the chamber provided by the skirt of the piston when the plunger is retracted. An annular washer 58 is seated in the bottom of the cup. The cup and washer are retained on the head of the piston by a spring 60 interposed between the washer 58 and a return valve 62 arranged to control the port 16 in the head 14 of the cylinder. The spring 60 also serves to return the piston to its normal position. The valve 62 supports an outlet valve 64. This valve is normally held in closed position by a spring 66 of such tension that it will yield under relatively light pressure.

Journaled in oppositely disposed walls of the reservoir 24 is a shaft 68. An arm 70 is keyed to the shaft. This arm is limited in its angular movement by a stop 72 on the cover plate 26. The arm has pivotally connected thereto one end of a rod 74, the other end of which is received by the recess 44 in the plunger with small clearance. The shaft 68 may be provided with an operating or foot pedal lever 76 connected by return springs 78 to a fixed support, not shown.

The return spring 78 normally maintains the arm 70 in contact with the stop 72. With the parts in this position there is sufficient clearance between the lower end of the rod 74 and the bottom of the recess 44 in the plunger to permit the plunger 38 to yield upwardly against the tension of its spring 52, thereby opening the port 56 and permitting fluid to flow from the cylinder to the reservoir 24.

The conduits 20 and 22 are connected to suitable cylinders 80 arranged to actuate a plurality of brakes 82. As shown, each of the brakes 82 includes a pair of shoes 84 having their articulate ends pivoted on a fixed support 86, and their separable ends engaging opposed pistons in the cylinder 80, the shoes being connected by a retractable spring 88. The cylinders 80 actuate the shoes to separate them into drum engagement.

Assuming that the system, including the reservoir 24, and the cylinder 10, is filled with suitable fluid or liquid, under this condition when the operating lever 76 is shifted to apply the brakes the plunger 38 is moved and carries with it the piston 30. The piston moving against the resistance of springs 60 imposes pressure on the fluid in the cylinder 10, causing displacement of the fluid through the outlet valve 64, the port 16 in the head of the cylinder, and the conduits 20 and 22 to the cylinders 80, resulting in spreading the friction elements of the brake against the resistance of the retractable springs 88 into drum engagement.

When the operating lever 76 is released, the retractable springs 78 return this lever to its normal position where the arm 70 on the shaft 68 engages the stop 72. In moving to this position the arm 70 moves the rod 74 to relieve the applied force on the plunger 38 and hence on the piston 30. With the applied force removed, the piston is returned to its retracted position where it seats on the retaining ring 32 by the spring 60 which expands when the applied force is removed. As the piston returns to its retracted position the fluid returns to the cylinder 10 from the cylinders 80. Movement of the column of fluid from the cylinders 80 to the cylinder 10 is due to pressure on the pistons of cylinders 80 imposed by the retractable springs 88 connected between the friction elements of the brakes. The retractable springs also serve to return the friction elements to release or off position.

Due to friction on the column of fluid in the cylinder 10 and conduits 20 and 22, and to the tension of the spring 60, the piston 30 returns to its seat on the retaining ring 32 slightly in advance of the return of the fluid to the cylinder. This causes a partial vacuum in the cylinder 10, resulting in collapse of the cup 54 and admission of fluid from the reservoir through the ducts or passages 36 to the cylinder. Further pressure in the cylinder causes the cup to return to static condition and moves the plunger 38 from its seat against the resistance of spring 52 to open the port 34 so that any excess fluid may be returned through the port 34, the chamber provided by the skirt of the piston, and the grooves or channels 48 to the reservoir 24.

When the fluid has been completely displaced from the cylinders 80 to the conduits 20 and 22, the cylinder 10, and the reservoir 24, and the pressure imposed on the fluid by the movement of the pistons in the cylinders 80 under the influence of the springs 88 is expended, the plunger 38 is moved by the spring 52 to close the port 34, the cup 54 having previously returned to its static condition, the apparatus is again in operative position.

In the present invention, which may be termed a closed system, all communications between the cylinder and the reservoir are normally closed when the piston is in retracted position. Under these conditions the fluid in the cylinder is under a pressure equal to the load of the spring-pressed plunger. However, provision has been made to permit the fluid to by-pass the piston in either of two directions in accordance with the dictates of temperature variations. Thus, if the volume of the fluid in the system decreases, due to a temperature drop, fluid from the reservoir can flow through the passageways 36 and around the edge of the collapsible cup 54 to compensate for the contraction of the fluid in the system. If, on the other hand, the fluid in the system increases in volume as the result of a rise in temperature, the fluid will raise the plunger 38 against the tension of its spring 52, thereby opening the port 56 and permitting some of the fluid to pass into the reservoir 24. In order to accomplish this latter result, it is essential that the plunger spring 52 be weaker than the return springs 88 located at the brake shoes.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid brake system comprising a piston having a port and a plurality of passages, a plunger movable in the piston to control the port, a member on the head of the piston controlling the passages, and means for applying force to the piston through the plunger.

2. A fluid brake system comprising a piston having openings in its head and a skirt providing a chamber, a spring-pressed plunger in the chamber having a flange adapted to seat on the back of the head of the piston and a part for controlling one of the openings, a guide for the plunger, a tension member between the guide and the flange, and means on the head of the piston controlling the remainder of the openings.

3. A fluid brake system comprising a piston having openings in its head and a skirt providing a chamber, a plunger movable in the chamber having a part controlling one of the openings, a flange on the plunger, a guide for the plunger having passages therein, a tension member on the plunger between the guide and the flange, and a cup on the head of the piston controlling the remainder of the openings in the head of the piston.

4. A fluid brake system comprising a cylinder, a head on one end of the cylinder having a port, a reservoir communicating with the other end of the cylinder, a compound valve controlling the port, a piston in the cylinder having a plurality of openings in its head and a skirt providing a chamber, a member movable in the chamber adapted to seat on the back of the head of the piston and to control one of the openings, a cup on the head of the piston controlling the remainder of the openings, and a tension member interposed between the valve and the cup.

5. A fluid brake system comprising a cylinder, a head on one end thereof having a port, a reservoir communicating with the other end of the cylinder, means for controlling the port including outlet and return valves, a piston movable in the cylinder having a plurality of openings in its head and a skirt providing a chamber, a spring-pressed plunger in the cylinder adapted to seat on the head of the piston and to control one of the openings, a cup on the head of the piston controlling the remainder of the openings, a tension member between the cup and the control means for the port in the cylinder, and means in the reservoir for actuating the piston.

6. A fluid brake system comprising a cylinder, a head on one end thereof having a port, a reservoir communicating with the other end of the cylinder, means controlling the port including an outlet and a return valve, a piston movable in the cylinder including a head having a port and a plurality of spaced passages and a skirt providing a chamber, a spring-pressed plunger adapted to seat on the back of the head of the piston and to close the port, a cup on the head of the cylinder adapted to control the passages, a tension member between the cup and the control means for the port in the cylinder, and means in the reservoir for actuating the piston through the plunger.

7. A fluid brake system comprising a master cylinder, an actuating cylinder, brake elements actuated thereby, a return spring for said elements, a conduit connecting the cylinders, means controlling the conduit including an outlet and a return valve, a reservoir communicating with the master cylinder, a piston in the master cylinder having a head provided with a plurality of openings and a skirt providing a chamber, a plunger in the chamber adapted to seat on the back of the piston head and to control one of the openings, a spring urging said plunger against said piston head, said spring being weaker than said return spring, a cup on the head of the piston adapted to control the remainder of the openings, a tension member between the cup and the return valve, and means in the reservoir for actuating the piston through the plunger.

8. A fluid brake system comprising a compression cylinder having a discharge outlet, a piston in said compression cylinder, means for operating said piston, a return valve controlling said outlet and opposing return flow therethrough, and valve means incorporated in the piston for retaining pressure in said compression cylinder upon retraction of said piston.

9. A fluid brake system comprising a compression cylinder having a discharge outlet, a piston in said compression cylinder, means for operating said piston, means opposing return flow through said outlet, and resilient means incorporated in said piston for retaining pressure in said compression cylinder upon retraction of said piston, and operable to compensate for increases in pressure in said compression cylinder.

10. A fluid brake system comprising a compression cylinder having a discharge outlet, a reservoir therefor, a piston in said compression cylinder, means including an overrunning connection for moving the piston in one direction, means for urging the piston towards its seat, means for opposing return flow through said discharge outlet, and separate means incorporated in said piston for normally closing communication between said compression cylinder and said reservoir to retain pressure in the former, said means being capable of compensating for increases of pressure in the compression cylinder due to atmospheric conditions.

HERBERT C. BOWEN.